…

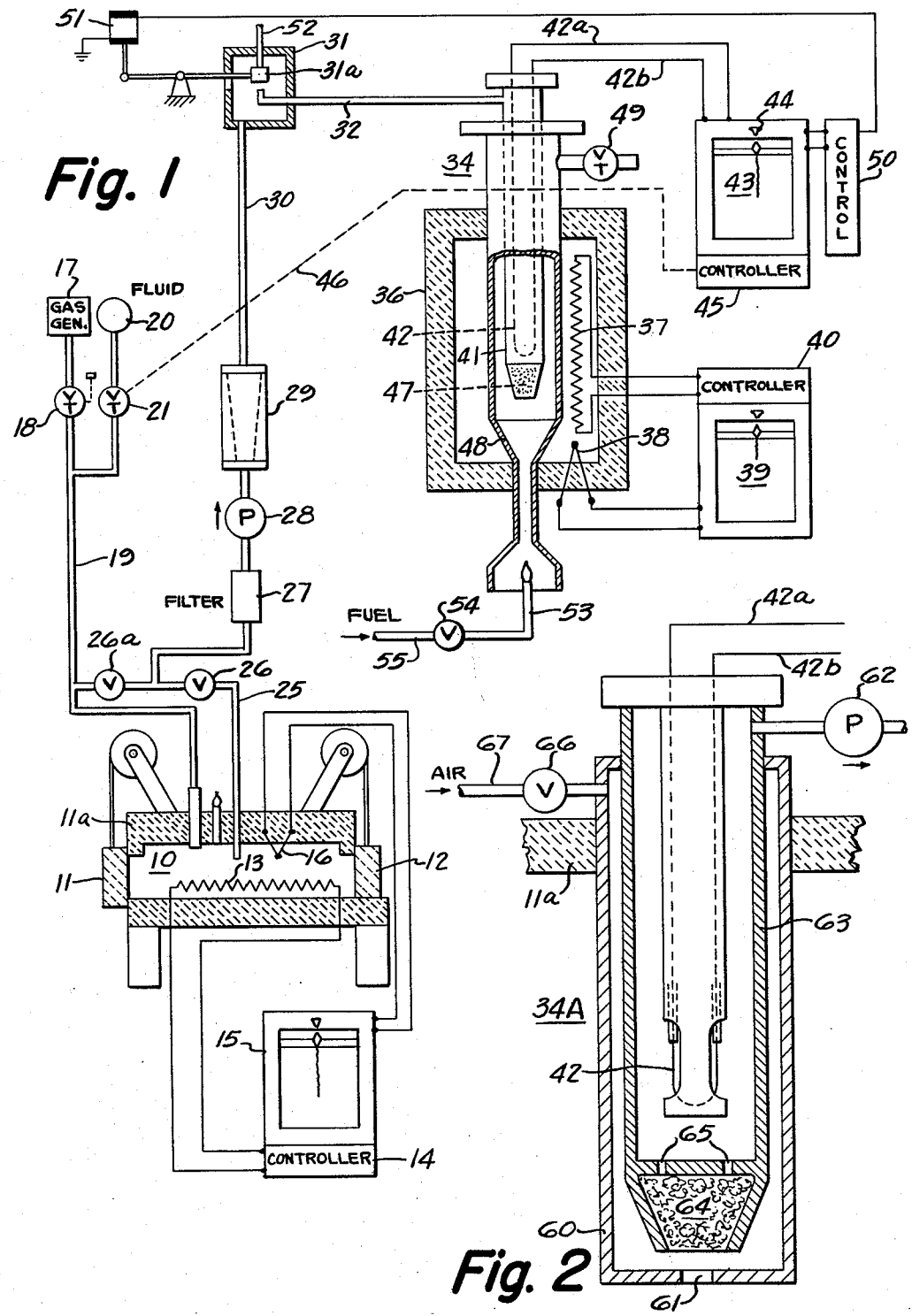

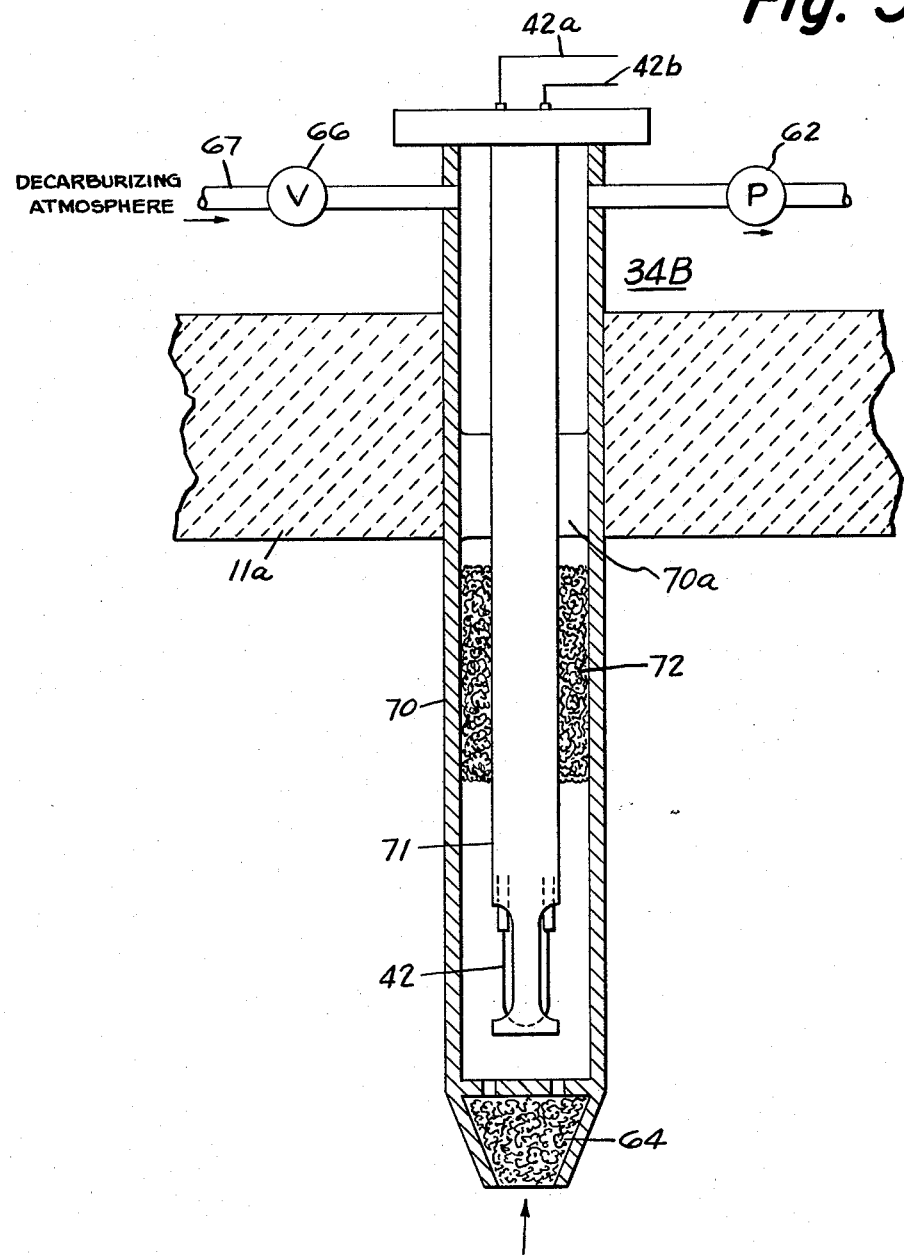

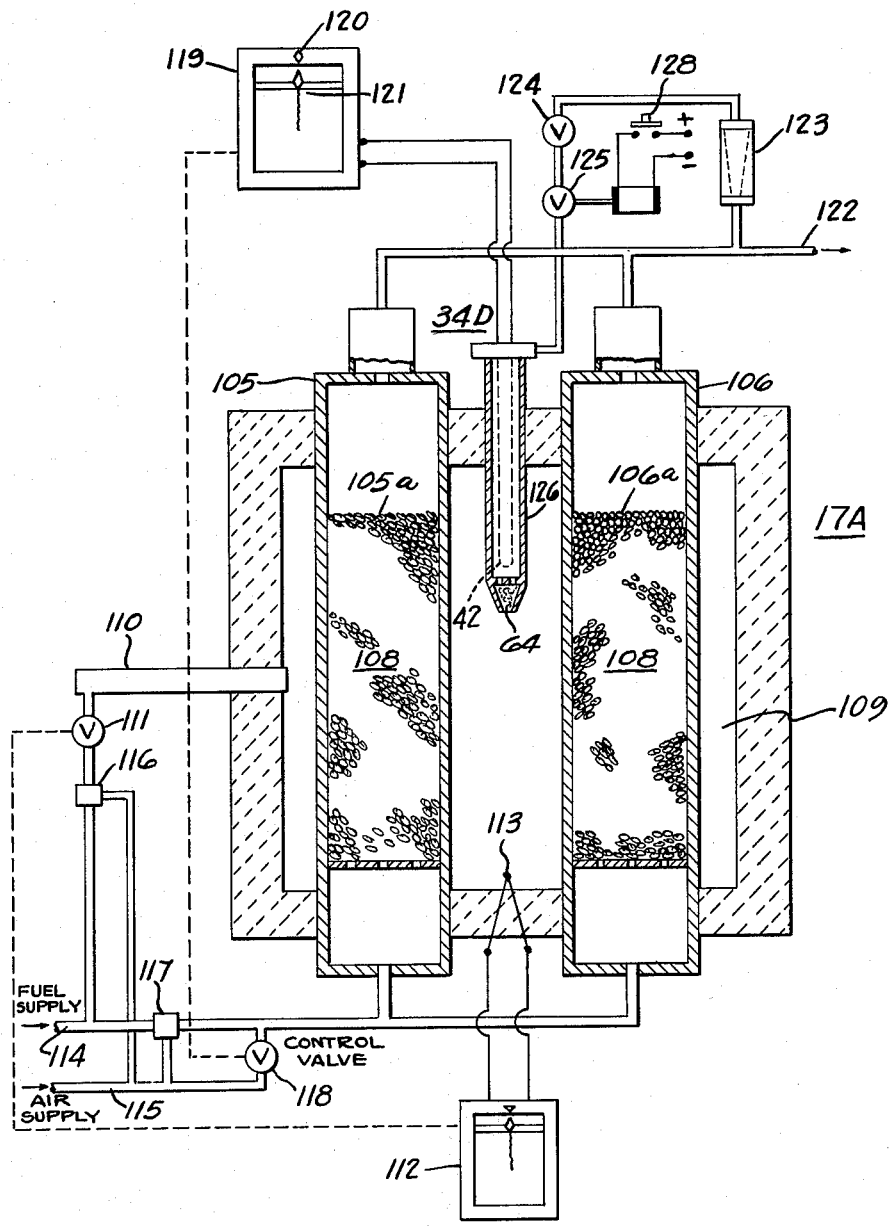

United States Patent Office 3,084,999
Patented Apr. 9, 1963

3,084,999
MEASUREMENT AND CONTROL OF
CONSTITUENT POTENTIALS
Raymond L. Davis II, Newtown Square, Pa., assignor to
Leeds and Northrup Company, Philadelphia, Pa., a
corporation of Pennsylvania
Filed July 11, 1960, Ser. No. 41,965
13 Claims. (Cl. 23—232)

This invention relates to methods of and apparatus for measuring and controlling the constituent potential of gaseous atmospheres and has for an object the provision of a method of and apparatus for protecting at all times against oxidation a sensitive element having an electrical characteristic which changes with change in the constituent potential of its ambient atmosphere.

The present invention is a continuation-in-part of my application Serial No. 790,123, filed January 30, 1959, for "Measurement and Control of Constituent Potentials," now Patent No. 3,011,873. In that application and in my Patent No. 2,698,222, dated December 28, 1954, there is set forth the manner in which a sensitive element comprising a filamentary ferrous metal alloy responds by change of its electrical resistance to changes in the constituent potential of its ambient atmosphere, and also how the resistance characteristic of the sensitive element may be reduced to a reproducible minimum level.

In my said Patent No. 3,011,873 there were disclosed the advantages of utilizing the hydrogen system over the $CO$, $CO_2$ system of decarburizing, the principal advantage being the lack of oxidation of the sensitive ferrous element.

In accordance with the present invention, it has been found that the $CO$, $CO_2$ system may be utilized without possibility of oxidizing the sensitive ferrous element by reducing the ratio of $CO_2$ to $CO$ and the ratio of $H_2O$ to $H_2$. More specifically, the oxidizing capability of a decarburizing atmosphere is reduced below that which will oxidize the filamentary ferrous metal of the sensitive element. The decarburizing atmosphere will, nevertheless, have retained therein sufficient oxygen and/or oxygen compounds to produce decarburization of the sensitive element.

In carrying out the present invention in one form thereof, the sensitive element comprising filamentary ferrous metal is disposed within a tubular member having a flow passage in communication with the interior of that tubular member. There is placed within the flow passage, which may be an end-portion of the tubular member, a substantial quantity of a reducing agent which has an affinity for oxygen at least equal to, preferably higher than, that of said filamentary ferrous metal. Reducing agents with affinity for oxygen less than that of the filamentary ferrous metal will afford a degree of protection to the filamentary ferrous metal, but cannot assure that the filamentary ferrous metal will be completely free of oxidation. There are provided means including the flow passage for selectively producing within the tubular member either a carburizing or a carbon-removing atmosphere. That carbon-removing atmosphere is attained by flow of decarburizing materials through the flow passage and through the reducing agent. Oxygen and oxygen compounds will react with the reducing agent to reduce the oxidation capability of the decarburizing atmosphere. That oxidizing capability is reduced below that which will oxidize the ferrous metal. Thus while the carbon content of the filamentary ferrous metal will be lowered by the decarburizing atmosphere, the filamentary ferrous metal itself is protected against oxidation and against the consequent reduction of its diameter or other change of cross-section of that element by oxidizing reactions. The arrangement also includes provisions for the flow of the carburizing atmosphere through the reducing agent. Thus, oxygen compounds formed with the reducing agent are reduced by the carburizing atmosphere which acts as a reducing medium for regenerating that agent preparatory to the time when a decarburizing atmosphere is next required for the sensitive element.

From the foregoing it will be seen that a further object of the invention is to provide a reliable and simplified system for calibrating the sensitive element by a carbon-removing atmosphere which at all times protects that sensitive element from loss of cross-sectional area by oxidation thereof.

The foregoing concepts underlying the present invention may be incorporated into a variety of systems utilized in the control of the constituent potential of furnace atmospheres, these systems being suited to a multiplicity of applications.

For further objects and advantages of the invention and for further reference to the systems mentioned above, reference is to be had to the following description taken in conjunction with the accompanying drawings, in which:

FIG. 1 diagrammatically illustrates one form of the invention applied to the constituent control of a metal-treating furnace;

FIG. 2 is a sectional view of a modified form of a detector assembly;

FIG. 3 is a sectional view of still another form of detector assembly;

Figure 4:
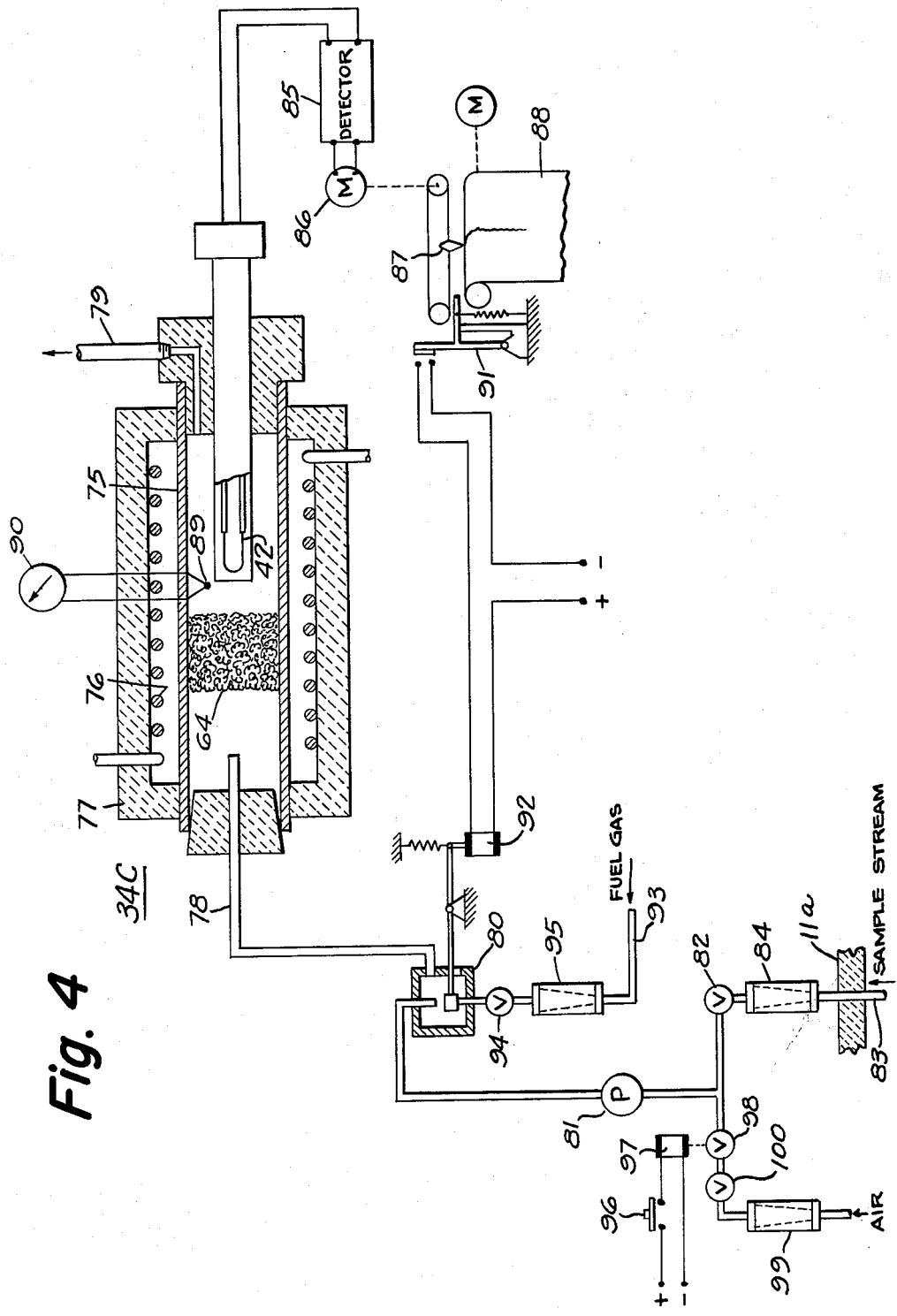

FIG. 4 diagrammatically illustrates a complete system with a further modification of the detector assembly; and FIG. 5 illustrates a system embodying the present invention for controlling the constituent potential of a carrier gas generator.

Referring to FIG. 1, the invention in one form has been shown applied to the control of the carbon potential of a metal-treating furnace 10 having access doors 11 and 12 and a heating element 13 which is under the control of a controller 14. An instrument 15 connected to a thermocouple 16 measures the temperature and in conjunction with the controller 14 maintains the furnace 10 at a selected temperature within the carburizing range. The carburizing agent may be derived from a carrier gas generator 17 which, under the control of a throttling valve 18, is supplied through a line 19 to the interior of the furnace. The carrier gas in line 19 is enriched by carburizing material in either liquid or gas form as indicated by the reservoir 20 labeled "Fluid." That material, such as methane, may flow by way of a throttling valve 21 into line 19 and thence to the furnace 10. Work inserted into furnace 10 through one of the access doors 11 and 12 will be subject to heat-treating conditions under an atmosphere having a predetermined carbon potential. This potential may be selected to produce carburizing of the work or to maintain a given surface carbon concentration during heat-treating operations.

In order to control the carbon potential of the atmosphere within furnace 10, there is withdrawn through a sampling line 25 under the control of a valve 26 a sample stream which passes through a filter 27. The valve 26a is normally closed. The dust-free sample from filter 27 passes through a pump 28 and thence through a flowmeter 29. The pump 28 is gastight in order to guard against ingress of air and contamination of the sample. The flowmeter 29 may be of any suitable type, the form illustrated being of the variable area type, such for example, as available on the market under the trade name "Rotometer." The valve 26 is adjusted until the pump 28 produces through the meter 29 a selected rate of flow.

As explained in my application Serial No. 790,123, the sampling line 25 is preferably of a material having high heat conductivity. For example, it can be made of copper pipe, suitably projected from oxidation as by water-jacketing, having a diameter of from 0.25 inch to 0.50 inch. This arrangement provides rapid cooling of the sample gas. Thus the temperature of the stream will be dropped from 1600° F. to a temperature of the order of 300° F. by the time the gas sample reaches the exterior of the furnace wall 11a. By reason of this rapid fall of temperature, the carburizing potential of the sample stream is maintained, and carbon is not lost by precipitation from the sample stream. Accordingly, the sample stream, after passage through the filter 27, the pump 28 and the flowmeter 29, passes by way of a line 30, a control valve 31, and line 32 to a constituent-determining assembly 34.

The assembly 34 is disposed within a heated compartment or furnace 36 having a heating coil 37, the energization of which is under the control of a thermocouple 38 connected to a measuring instrument 39 which in turn regulates the operation of a controller 40 to maintain the heated compartment of furnace 36 at a predetermined temperature, preferably the same as that of the treating furnace 10. Well below the top wall of the furnace 36 there is disposed within a tubular element 41 a sensitive element 42 in the form of a filamentary ferrous metal. This sensitive element may be structurally and compositionally like that disclosed and claimed in Besselman et al. Patent 2,514,857, though the nickel-ferrous alloy disclosed in my Patent 2,698,222 is to be preferred.

It will be observed that the line 32 communicates with the interior of tube 41, and thus as the sample stream of the carburizing atmosphere from the furnace 10 flows downwardly within the tube 41, it is elevated to the temperature of the furnace 36. The sample stream as it contacts the sensitive element 42 modifies its carbon content to correspond with that of its ambient atmosphere produced by the sample stream. The change in carbon content of the element 42 changes its resistance. By means of a measuring instrument 43, the carbon potential of the atmosphere of the furnace 10 is at all times measured, indicated and/or recorded by that instrument. The desired carbon potential to be maintained in furnace 10 is selected by a control-point setter 44 on a carbon-potential scale (not shown). If there should be deviation from the selected control point, a controller 45 is effective to operate through the mechanical connection 46 the valve 21 to modify the quantity of carburizing agent supplied to the furnace 10 from source 20 to change the carbon potential in furnace 10 in a direction to return the carbon potential of its atmosphere to the control point.

The present invention includes the provision within a flow passage of the tubular member 41 of a substantial quantity of a reducing agent 47. Thus as shown in FIG. 1, the reducing agent is placed within the lower end of the open-ended tube 41. All of the sample stream supplied through line 32 creates the sampling atmosphere for element 42 and then passes through the reducing agent 47. The sample stream then flows from the lower open end of the tube and into the outer housing or tubular member 48. The stream flows upwardly and exits from the system by way of a throttling valve 49 which discharges to atmosphere. The reducing agent is preferably in the form of a metal wool inert to carbon, such for example, as of copper or manganin, though other metals and many other alloys can be utilized. Wool made from ferrous metal and its alloys is not preferred, and in general, the metallic wool utilized will be inert with respect to carbon, that is, it will be of a character which will not carburize in the presence of the carburizing atmosphere. Manganin wool has been found to be highly satisfactory. The term "wool" is defined for the purposes of this application as including metal cloth. Thus, the manganin wool may take the form of No. 36 wire, flattened and woven into a fabric, which fabric is then rolled and pressed into the flow channel communicating with tubular member 41.

As for the manganin itself, any of the commercial grades of that alloy will be suitable. As indicated above, all alloys will be suitable if inert to carbon, that is, alloys which do not absorb carbon. Manganin and similar alloys are preferred because of the presence of manganese, a material which is active in forming oxygen compounds. Where copper and copper alloys are utilized, the amount of wool utilized will be increased because of the decreased activity in respect to oxygen, particularly when the affinity for oxygen is less than that of manganin. As the carburizing gases pass through the manganin wool 47, oxygen compounds present in the manganin wool are reduced, the reducing actions taking place serving to regenerate the manganin for the purposes now to be described.

For calibrating operations and for other purposes, it is desirable at times to change the atmosphere surrounding the sensitive element 42 from a carburizing atmosphere to a carbon-removing atmosphere. This may be accomplished by a control device 50 acting on a time cycle, or from time to time manually actuated. When the control device 50 functions, a solenoid 51 is energized to move a valve element 31a to close the line 32 and to open a line 52 to atmosphere.

Though not earlier described, this allows diffusion into tube 41 through wool 47 of a sweep-gas which continually flows upwardly through the outer housing 48 to prevent accumulation in the outer flow channel between tubes 41 and 48 of carbon from the carburizing gas which as a stream flows through the manganin reducing agent 47. The sweep-gas may be the air atmosphere. Its circulation will be induced by the chimney effect of the outer tubular member 48, and the actions resulting from the sweep-gas, if it be air, will be the same as later described for products of combustion used as the sweep-gas in FIG. 1. The sweep-gas may be conveniently generated by burning fuel as indicated by the jet 53 regulated by throttling valve 54 connected to a fuel supply line 55. Thus, the sweep-gases are spent products of combustion including a substantial quantity of excess air. The sweep-gases without modification have the disadvantage that they can produce oxidation of the ferrous metal of which element 42 is composed. If substantial oxidation of that element takes place, its life is shortened.

In accordance with the present invention, it has been found that the sweep-gases after passage through the reducing agent, the manganin wool 47, will represent a suitable and satisfactory decarburizing medium by reason of the diminution of the oxidizing content of such gases by chemical reactions between the wool 47 and oxygen compounds present within the gases. Accordingly, it is only necessary to establish within the flow channel to the tube 41 the reducing agent 47 in adequate quantity for modification of the in-flowing products of combustion to maintain the oxidizing capability thereof below that value which will cause oxidation of the sensitive element 42 during the period required for calibration. The calibration period will seldom, if ever, exceed fifteen minutes and, accordingly, the quantity of reducing agent in the form of manganin wool may be of the order of 6 grams, an amount which will provide a desired excess of reducing agent for the specified calibrating period. Any amount above this quantity will, of course, be suitable. It is to be noted that the reducing agent, when the sweep-gases are admitted, in accordance with the present invention, chemically modifies them as they progress through the manganin wool to establish within the inner tube 41 the desired decarburizing atmosphere. It is further to be noted that the reducing agent is regenerated during normal operation of the sensitive element 42 in the control of the carbon potential of the furnace 10. More specifically, $CO_2$ and $H_2O$ in the combustion products react with the reducing agent to form oxygen-compounds with the metallic components of the manganin materially to reduce in the decarburizing atmosphere at element 42 the ratios of $CO_2$ to CO and $H_2O$ to $H_2$. In the foregoing manner, there have not only been overcome certain of the disadvantages of some of my earlier systems, but there has also been achieved considerable simplification in the system with fewer necessary associated elements required for the system.

Now that the principles of the invention have been set forth, it is to be understood that many modifications of the present invention may be utilized, such for example, as the arrangement shown in FIG. 2. In FIG. 2, the constituent-determining assembly 34A is shown protruding through the upper wall 11a of a work-treating furnace, such as shown in FIG. 1. The outer tubular member 60 has an opening 61 at its lower end through which a sample stream is introduced into the interior thereof under the influence of a pump 62. The inlet to pump 62 connects with the interior of an inner tubular element 63. Thus the sample stream from the furnace passes directly through the opening 61 and thence through a substantial quantity of a reducing agent 64, through openings 65 and into the interior of tube 63 where the sensitive element 42 is disposed.

In FIG. 2 the manganin wool is retained in a relatively large pocket formed at the end of the tubular member 63, and the regenerating action described above takes place as the carburizing atmosphere from the furnace is passed through that wool en route to the sensitive element 42. Whenever it is desired to calibrate the sensitive element 42, or otherwise to produce within tube 63 a decarburizing atmosphere, it is only necessary to open valve 66 to connect the interior of the tube 60 to an air supply line 67 for flow of air into the interior of tubular member 60 and to deenergize the pump 62. The air introduced by way of valve 66 flows downwardly between the tubular members 60 and 63 and is elevated in temperature. As it mixes with the carburizing atmosphere in the region of the opening 61, combustion takes place and the products of combustion diffuse through the manganin wool 64 and into the interior of the tube 63. Combustion is assured since the constituent-measuring assembly or probe 34A has the major portion of its length extending into the carburizing furnace and is thus heated to a temperature above about 1500° F. which is above the ignition temperature of the gaseous mixture. In this manner there is produced the decarburizing atmosphere around the sensitive element 42 which by reason of the wool 64 is characterized by an oxidation potential below that necessary to produce oxidation of the filamentary ferrous metal which comprises the sensitive element 42. The modification of FIGS. 2 and 3 may be used in the auxiliary furnace arrangement of FIG. 1 by introduction of the sample stream through the bottom of tubular member 48, relocating the pump or admitting air through line 67, for calibrating purposes.

In accordance with the modification of FIG. 3, there has been shown a fractional part of the top wall 11a of the furnace of FIG. 1. Through this wall 11a there extends the constituent-determining assembly 34B. This assembly includes an outer tubular member 70 and an inner tubular member 71 from which there extends at the lower end the sensitive element 42 of filamentary ferrous metal. A reducing agent 64 of manganin wool serves the same functions as in the modifications of FIGS. 1 and 2 during ingress of oxidizing gases for any reason into the assembly 34B. However, the arrangement of FIG. 3 differs in the manner of producing the decarburizing atmosphere for the sensitive element 42. Thus, whenever decarburization is desired, the pump 62 is deenergized and the valve 66 opened for admission from a supply line 67 of a decarburizing atmosphere, such for example, as products of combustion freed of condensate as by elevation of their temperature. The gases introduced by way of valve 66 into the interior of tubular member 70 flow downwardly and through a second quantity of a reducing agent in the form of manganin wool 72 which fills the entire flow passage between tubular members 70 and 71. Thus as the decarburizing atmosphere moves downwardly through a centering device including spokes 70a and through the reducing agent 72, the oxidizing potential or capability thereof is reduced to a point where it will not adversely affect the element 42 by oxidation thereof, though it will remain effective as a carbon-removing agent.

When the calibrating operation has been completed or the decarburizing action otherwise terminated, the valve 66 will be closed and the pump 62 again placed in operation. The carburizing gases flow through the reducing agent 64 to establish around the sensitive element 42 a carburizing atmosphere. These gases then in outward flow pass through the reducing agent 72. Thus, the manganin wool 72 is subjected to flow therethrough of the carburizing agent to assure its effectiveness during flow therethrough of the decarburizing atmosphere.

It will be observed that in the modification of FIG. 3 the manganin wool 64 does not affect either the oxidation or the reduction actions associated with calibration, both functions now being performed by the manganin wool 72. The manganin wool 64 is, nevertheless, included in the modification of FIG. 3 to protect the sensitive element 42 in cases where it is desirable to withdraw the constituent-detecting assembly 34B from the furnace for cooling in air. As disclosed in my Patent 2,698,222, it is desirable to withdraw the measuring assembly 34B from the furnace prior to shutdown in order rapidly to cool the same. If element 42 be rapidly cooled a relatively small quantity of manganin wool 64 will remove such oxygen from the atmosphere as may diffuse through that wool into the chamber during the cooling period to prevent oxidation of the element 42. After the cooling to room temperature of element 42 any oxidation of element 42 which can take place is wholly negligible.

By reason of features of the invention thus far described, the systems earlier presented can be further simplified. For example, in the modification of FIG. 4 the constituent-determining assembly 34C comprises the sensitive element 42 which is disposed within an outer tube 75 which is surrounded by heating means shown in the form of an electrical heating element 76 supported on the inner surface of an enclosing housing 77 of heat-insulating refractory material. The reducing agent 64 in the form of a metallic wool inert to carbon, such as manganin, and oxidizable by oxygen-bearing compounds is disposed in the flow passage between the detecting element 42 and the supply line 78. The inlet pipe 78 serves the purpose of introducing both the sample stream of gases, the carbon potential of which is to be measured, and the gases used to form the decarburizing atmosphere for the element 42. An outlet or exhaust passage 79 provides for flow of the gas from the interior of the tube 75.

For the measurement of the carbon potential of a sample stream, a control valve 80 will be in its illustrated position, a pump 81 will be energized, and a valve 82 adjusted to provide a selected rate of flow of the sample stream through the sample line 83 as indicated on a flowmeter 84. The sample stream will flow by way of valve 80 and the inlet pipe 78 to the interior of the tube 75. The sample stream, elevated in temperature within tube 75, passes through the reducing agent 64 and regenerates the same. The sample stream produces an atmosphere about the sensitive element 42, which element then gives up or absorbs carbon until its carbon content corresponds with the carbon potential of the atmosphere. The resistance of the sensitive element 42 is measured by conventional equipment which may include a detector 85 which functions to control the energization of a motor 86 for driving a pen index 87 to indicate and/or record, as on chart 88, the carbon potential of the atmosphere. Though heat-controlling means may be provided for the heating resistor 76, in some instances close heat control may not be required and, accordingly, a thermocouple 89 may be utilized to energize a millivolt meter 90 calibrated in terms of temperature. Though the supply means for the heating resistor 76 has not been illustrated, it will be understood it will be connected to a suitable source of supply and that the energization may be varied to produce a temperature indication on meter 90 within the carburizing range.

The simplified system of FIG. 4 particularly lends itself to batch type furnaces which in the course of operation are sometimes opened for removal of work and for loading thereof. Batch type furnaces may be open to the air atmosphere over relatively extended periods of time, and as a result a sample stream from the furnace may include in mixture therewith enough oxygen to exhaust the oxygen-removing capability of the reducing agent 64. As a matter of fact, the sample stream may sometimes consist entirely of air-atmosphere since during extended periods of time when the furnace is open, the flow of carburizing agent for reasons of economy may be terminated. In such an event, rapid oxidation of the sensitive element 42 at the relatively high temperatures could take place to shorten the life of that element.

To overcome the foregoing possibilities, there have been diagrammatically shown in FIG. 4 safety provisions including a safety switch 91 which upon operation of the pen index 87 to a predetermined low carbon potential for the sensitive element 42 closes a circuit for the solenoid 92 of valve 80 to transfer the connections from the pump 81 to a supply line 93 leading to a suitable source of fuel gas. A valve 94 permits adjustment of the rate of flow of gas as read by flowmeter 95 to a desired value and one adequate to produce in the region of the element 42 a non-oxidizing or protective atmosphere. Sources of fuel gas are available in metal-working shops and may conveniently be natural gas, propane, and the like. Thus natural gas, generally almost entirely methane, though sometimes mostly propane, will produce regeneration of the reducing agent 64 and will also provide a protective atmosphere for the element 42. As the protective atmosphere of carburizing character builds up around the sensitive element 42, its carbon content will, of course, rise and the protective switch 91 will open. Decarburizing gases from the furnace will resume flow and will reduce the carbon content of element 42. The switch 91 will again close. Thus the system will cycle to maintain a protective atmosphere about the element 42, having a carbon potential above that set for operation of switch 91 and which is above its minimum value. The switch 91 is always operated whenever the atmosphere of the furnace reaches a carbon potential of a low, but nevertheless measurable, magnitude by the detector 85.

The system of FIG. 4 includes provisions for calibrating the sensitive element 42. Thus, by operating a calibrating switch 96, a solenoid 97 of a valve 98 is energized to open the valve for flow of air through a flowmeter 99 and through a throttling valve 100 for mixture with the sample stream from the furnace at the intake to pump 81. The addition of air to the sample stream will reduce its carbon potential. If enough air is added as determined by the setting of the valve 100, the atmosphere produced about the element 42 will be of carbon-removing character. When element 42 is reduced to a minimum value and maintained at that value for a predetermined period of time, the indication of the pen index 87 will be noted, and if it does not register the known predetermined reproducible value for the carbon, the measuring circuit will be adjusted to recalibrate the system, that is to shift the index 87 to the aforesaid reproducible value. For a detailed explanation of calibrating operations, and background theory, reference may be had to my Patent No. 2,698,222 and to my above-identified application.

As an example of further versatility of the present invention, it will be seen from the modification of FIG. 5 that the character of generated atmospheres may be controlled by the sensitive element 42 which forms a part of a constituent-determining assembly 34D. It will be remembered that in the system of FIG. 1 the gas generator 17 was described as supplying a part of the atmosphere for the furnace 10. As well understood by those skilled in the art, the carburizing atmosphere of a metal-treating furnace has two principal requirements. First, it must be present in large volume. Second, it must meet the requirements in terms of available carbon for the desired carburizing operations. The gas generator 17 is utilized to supply carrier gas to meet the volume requirements. The addition of an enrichment fluid provides the needed carbon supply. While the enrichment fluid from source 20, FIG. 1, will ordinarily be a hydrocarbon compound of more or less fixed composition, the composition of the gases from the gas generator 17A (FIG. 5) may vary. If that composition varies, there can be produced substantial changes in the carbon potential, a result undesired from the standpoint of desired uniformity in operation.

In FIG. 5 the gas generator 17A includes a pair of retorts 105 and 106, each filled to levels 105a and 106a with catalytic material 108. The retorts 105 and 106 are mounted within a combustion chamber 109 provided with a burner 110 supplied with fuel gas and also with an outlet (not shown) leading to a stack. The fuel burner 110 has a control valve 111 operable by an instrument 112 to maintain constant the temperature within the combustion chamber 109 as detected by a thermocouple 113 connected to the instrument 112.

The same source of fuel as indicated by the supply line 114 may be utilized for the burner 110 and for the gas supply to the retorts 105 and 106. Air is supplied to the burner through a mixing valve 116 and through a mixing valve 117 to the retorts 105 and 106. The mixing valve 117 will be set to supply somewhat less air than will be desired, thus to make effective a control valve 118 utilized to control the additional supply of air needed by the retorts 105 and 106. Control valve 118 is operated by a measuring instrument 119 to which the sensitive element 42 is connected. In manner well understood by those skilled in the art, the instrument 119 has a control-point setter 120. If the measured value as indicated by the pen-index 121 deviates from the control point as established by the control-point setter 120, then the valve 118 is opened with the deviation in one direction and closed with the deviation in the opposite direction to return the carbon potential to its set value.

With a fuel supply of natural gas, the catalytic beds or catalytic material 108 can be of nickel-impregnated alundum. The result of the reactions within the retorts will be the conversion of the natural gas, mostly methane, to carbon monoxide, of the order of 20%, and to hydrogen gas, of the order of 40% with the remainder nitrogen and including low concentrations of carbon dioxide and water vapor and traces of methane. Such a resultant atmosphere has a high carbon potential. The potential decreases with increase of the carbon dioxide and water vapor. Greater quantities of air increase the amount of carbon dioxide and water vapor present in the outlet line 122. Accordingly, by supplying the sensitive element 42 with a sample stream from the outlet line 122 as by way of a flowmeter 123 and a throttling valve 124 and shut-off valve 125, it will be seen that the carbon potential of the gas in outlet line 122 will be constantly measured by the instrument 119. If the carbon potential increases or decreases above or below the selected value as determined by control-point setter 120, the valve 118 will be operated to vary the supply of air to return the carbon potential to its selected value.

By suitably mounting the constituent-determining assembly 34D for variation of its depth of penetration into the heated combustion chamber 109, the temperature of the sensitive element 42 and of the sample gas passing over it can be adjusted to any desired temperature less than the operating temperature of chamber 109. The significance of this provision is that the temperature at which the product gas is used is the temperature at which its potential should be measured and controlled rather than the temperature at which the gas is generated. Since the product gas is usually used as a carrier gas, to be further enriched before or after introduction into a furnace, its carbon potential as generated need not be critically measured or critically controlled. Accordingly, relatively close temperature-matching will suffice.

To facilitate adjustment of the immersion of the sensitive element 42 for adjustment of its operating temperature, a thermocouple temperature-measuring system of suitable construction (not shown) is provided in tubular member 126 side by side with the element 42. The arrangement may be the simple system of FIG. 4 including thermocouple 89 and meter 90. Occasional measurement of the temperature of the element 42 will then be made for the positioning of assembly 34D. After several refinements of adjustment have been made over a period of several hours, the desired temperature will be closely maintained in the sensitive element 42, and thereafter infrequent checking, as for instance, once a day, will be sufficient.

It will be observed that the lower end portion of the outer tubular member 126 is filled with a reducing agent, such as manganin wool 64. It will be further noted that the sample stream from the outlet line 122 flows outwardly through the manganin wool 64 into the combustion chamber 109. This provides the flow of gases through the manganin wool for regeneration thereof. In order to initiate a calibrating operation for the element 42, it is only necessary to operate a calibrating switch 128 to close valve 125. The combustion gases within the combustion chamber 109 then diffuse through the manganin wool 64 to form a carbon-removing atmosphere around the element 42. As carbon is removed from the element 42, the instrument 119 continuously reflects the decreasing carbon content. When it attains a minimum value, as for example +0.04% carbon and retains that value for a period of from three to four minutes, it is known that the carbon content has attained a reproducible minimum value. Accordingly, the instrument 119 may be adjusted to indicate the +0.04% value and to assure subsequent accurate control of the constituent potential of the gas in line 122.

What is claimed is:
1. A constituent potential measuring system, comprising
a sensitive element including a filamentary ferrous metal element the electrical resistance of which varies with the carbon content thereof,
a tubular member within which said element is supported,
said tubular member having an outlet connection thereto for discharge of gases therefrom and having access means through which there may be selectively introduced into the region of said ferrous metal element gases developing a carbon-imparting atmosphere whose carbon potential is to be measured and gases developing a carbon-removing atmosphere including oxygen-bearing compounds,
selective means including at least one flow connection to said access means and selectively operable between predetermined positions for
(a) in a first of said positions establishing communication between said tubular element and a carburizing atmosphere for flow of that atmosphere into said region occupied by said ferrous metal element, and
(b) in a second of said positions establishing communication between said tubular element and said gases forming said carbon-removing atmosphere including said oxygen-bearing compounds,
a substantial quantity of a reducing agent having an affinity for oxygen at least equal to that of said ferrous metal element disposed within said tubular member in a position relative to that of said outlet connection and to that of said access means for flow therethrough of said carbon-removing atmosphere prior to arrival in said region occupied by said ferrous metal element for reducing the quantity of oxidizing compounds present in said carbon-removing atmosphere to a point where their oxidizing capability is below that which will oxidize said element and also for flow through said reducing agent of the gases forming said carburizing atmosphere in said region of said ferrous metal element for regeneration of said reducing agent.

2. The combination of claim 1 in which said tubular member is enclosed within an outer tube, heating means for said outer tube and said tubular member for maintaining the temperature thereof within the carburizing range, and supply means for supplying to the interior of said outer tube said gases of a carbon-removing character and characterized by the presence therein of said oxygen compounds.

3. The combination of claim 2 in which said supply means includes combustion means for producing products of combustion forming the source of supply of said gases of carbon-removing character.

4. The combination of claim 3 in which said outer tube is open at its lower end and which extends through said heating means, said combustion means being located adjacent the lower open end of said outer tube, an exit passage adjacent the opposite end portion of said outer tube, said outer tube producing a chimney effect for flow of the combustion gases through said outer tube.

5. The combination of claim 1 in which said tubular member is enclosed within an outer tube having a flow passage at its lower end, said outer tube and said tubular member having substantial length for insertion into a heated chamber the carburizing atmosphere of which is to be measured, suction means connected to the outlet connection of said tubular member for withdrawal through said flow passage and through said tubular member of a sample of the atmosphere whose carbon potential is to be measured, and means for supplying air atmosphere to the upper portion of said outer tube for downward flow into the region of said flow passage, the carburizing atmosphere in mixture with said flow of air producing combustion in the region of said reducing agent for diffusion through said reducing agent into said tubular member of gases forming said carbon-removing atmosphere around said sensitive element.

6. The combination of claim 1 in which said tubular member is enclosed within a heated compartment and in which said access means comprises a single inlet to said tubular member in a position on the side of said reducing agent remote from said filamentary metal element, said selective means including a valve operable selectively to produce flow through said single passage of said carburizing atmosphere and of said carbon-removing atmosphere.

7. The combination of claim 1 in which said tubular member and said sensitive element are disposed within a combustion chamber of a carrier gas generator, a fuel burner for supplying combustion gases to said combustion chamber of said generator, at least one gas generating retort disposed within said combustion chamber, said selective means having a flow passage connected to said retort for producing about said sensitive element an atmosphere corresponding with that of said carrier gas, and means for terminating the flow of said carrier gas to said sensitive element for diffusion through said reducing agent of combustion gases from said combustion zone for producing said carbon-removing atmosphere in the region of said sensitive element.

8. The combination of claim 1 in which said reducing agent is disposed within said tubular member in a position adjacent an open end portion thereof,
said access means including said open end portion for flow through said reducing agent of said gases developing said carbon-removing atmosphere and in which said access means also includes a second flow connection to said tubular member at a location remote from its open end for flow into said region of said ferrous metal element of gases forming said carbon-imparting atmosphere whereby carburizing gases flow in one direction through said reducing agent and said gases forming said carbon-removing atmosphere flow in the opposite direction through said reducing agent.

9. The combination of claim 1 in which said reducing agent is disposed in two locations, the first adjacent a lower open end portion of that tubular member and the second disposed upwardly of the location of said ferrous metal element within said tubular member and below the location of said outlet connection, said selective means including a suction pump flow connected to said outlet connection for inducing flow, with said selective means in said first of its positions, through said open end portion of said tubular member of said gases developing said carbon-imparting atmosphere in the region of said element and thence through said reducing agent in said second location and then outwardly through said outlet connection, and said access means including a flow connection extending from the upper portion of said tubular member for flow through said reducing agent in said second of its locations of said gases developing said carbon-removing atmosphere, said last-named flow occurring with said selective means in said second of its positions and without application of suction by said pump to said outlet connection, whereby said gases developing said carbon-imparting atmosphere flow through said reducing agent in one direction and said gases developing said carbon-removing atmosphere flow therethrough in the opposite direction.

10. The combination of claim 1 in which said reducing agent consists of metallic wool of an oxidizable metal substantially inert to carbon.

11. The combination with a ferrous metal element the electrical resistance of which varies with the carbon content thereof, of a housing within which said element is supported, a substantial quantity of a reducing agent comprising manganin wool having an affinity for oxygen at least equal to that of said metal element disposed in a passage communicating with the interior of said housing, and selective means operable between two positions and including flow passages connected to said housing for selectively controlling the flow of gaseous materials through said reducing agent, said selective means in one of its two positions admitting a carburizing atmosphere to the interior of said housing to carburize said element and for flow of said carburizing atmosphere through said agent to deoxidize said reducing agent and in a second of its two positions admitting a decarburizing atmosphere for flow through said agent and into said housing, said agent reducing any oxidizing characteristics of said decarburizing atmosphere prior to contact with said element to prevent oxidation of said element during decarburization thereof.

12. The combination with a thin ferrous metal element, an electrical characteristic of which varies with the carbon content thereof, of a tubular member within which said element is supported, a flow passage for supplying to the inside of said tubular member a carburizing atmosphere the carbon potential of which is to be measured in terms of change in the electrical characteristic of said metal element, said tubular member having an outlet passage for outward flow of said carburizing atmosphere, and means connected to said flow passage for interrupting flow into said member of said carburizing atmosphere and for establishing flow into said member through said flow passage of an inward flow of a decarburizing atmosphere, said tubular member having disposed therein a substantial quantity of a reducing agent having an affinity for oxygen at least equal to that of said metal element for application to said metal element of a substantially non-oxidizing carbon removing atmosphere diffused through said reducing agent into and about said filamentary metal for reduction of its carbon content to a reproducible minimum value.

13. The method of measuring the carbon potential of an atmosphere surrounding a detecting element of ferrous metal, the electrical resistance of which varies with the carbon content thereof, which comprises applying heat to maintain said detecting element at a temperature within the carburizing range, directing a sample stream of carburizing gases through a flow passage to produce in the region of said detecting element an atmosphere whose carbon potential is to be measured, changing the composition of the gases forming the atmosphere surrounding said filamentary ferrous metal to produce a carbon-removing atmosphere including oxygen-bearing compounds, prior to the production of said carbon-removing atmosphere in the region of said ferrous metal reacting said oxygen-bearing compounds with a reducing agent of metallic wool inert to carbon for reducing the quantity of oxidizing compounds present in the carbon-removing atmosphere produced in the vicinity of said detecting element to prevent oxidation of said element during carbon removal therefrom, and thereafter reacting the oxygen compounds of said reducing agent with said carburizing gases to restore the effectiveness of said reducing agent during the production in the region of said filamentary ferrous metal of said atmosphere whose carbon potential is to be measured.

References Cited in the file of this patent

UNITED STATES PATENTS

| | | |
|---|---|---|
| 2,541,857 | Besselman et al. | Feb. 13, 1951 |
| 2,667,410 | Pierce | Jan. 26, 1954 |
| 2,698,222 | Davis | Dec. 28, 1954 |
| 2,886,478 | Beard | May 12, 1959 |